July 2, 1968   L. J. LOGAN   3,391,266
FERRULE CHUCK
Filed Sept. 2, 1964

INVENTOR.
LEWIS J. LOGAN
BY
Woodling Krost Granger + Rust
Attys.

United States Patent Office 3,391,266
Patented July 2, 1968

3,391,266
FERRULE CHUCK
Lewis J. Logan, 11820 Edgewater Drive,
Lakewood, Ohio 44107
Filed Sept. 2, 1964, Ser. No. 393,890
5 Claims. (Cl. 219—98)

ABSTRACT OF THE DISCLOSURE

A ferrule chuck for use with a stud welding gun. The chuck is a flat unitary metal member with a relatively small thickness dimension. The chuck has a slotted opening that enables it to be connected to the gun's supporting leg. The gripping action of the chuck is provided by an opening of slightly more than one-half of the circumference of a circle. This opening exhibits a spring like holding effect because it is defined by two spaced slots which create two gripping fingers with a tongue member therebetween.

---

The present invention in general relates to a new and improved chuck for holding so-called ferrules commonly used in stud welding operations.

An object of the present invention is to provide a new and improved ferrule chuck into which the ferrule can be inserted in a much easier and more convenient manner than in prior art devices.

Another object of the present invention is to provide a ferrule chuck which enables the stud welding apparatus to handle much shorter studs to be welded without any change in the conventional stud welding apparatus.

Another object of the present invention is to provide a new and improved ferrule chuck for use in stud welding operations which is provided with a means for conveniently shifting the ferrule chuck relative to a stud chuck on the welding apparatus.

Another object of the present invention is to provide a ferrule chuck which includes a generally flat unitary member provided with first and second elongated slots to define spaced first and second holding fingers separated by a tongue member which fingers and tongue member are adapted to generally surround at least a portion of a ferrule to hold it in position during a welding operation.

Another object of the present invention is to provide a ferrule chuck which has an extremely small thickness dimension wherein the ferrule holding mechanism is contained within this thickness dimension thereby enabling much shorter studs to be held by the stud chuck of conventional stud welding apparatus while still performing a successful stud welding operation.

Other objects and a fuller understanding of this invention may be had by referring to the following description and claims, taken in conjunction with the accompanying drawing, in which:

Figure 1:
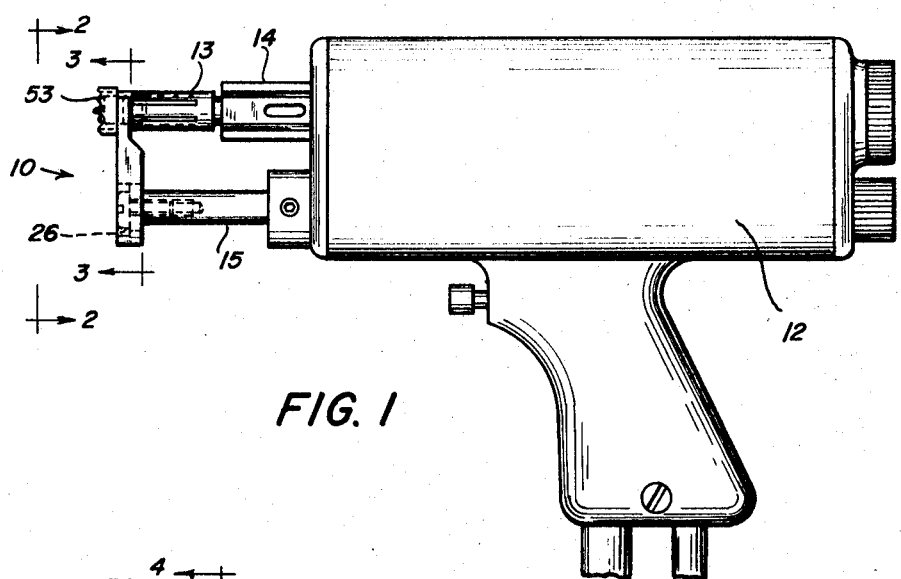
FIGURE 1 is a side elevational view of the ferrule chuck of the present invention illustrated in its environment as attached to the adjustable leg of a stud welding gun.

The ferrule chuck which is the subject of the present invention has been identified by the reference numeral 10 in the accompanying drawing and is adapted for use with a stud welding gun 12 shown in FIGURE 1. The stud welding gun is conventional and includes a stud chuck 13 secured to a lifting coil (not shown) within the gun by means of an adapter 14 and the stud gun also has an adjustable support leg 15 which extends generally parallel with the stud chuck 13.

The ferrule check 10 is shown in more detail in FIGURES 2 through 5 and comprises a generally flat unitary metal member 18 with a relatively small thickness dimension and is also provided with first and second end portions 20 and 21, respectively.

Figure 2:
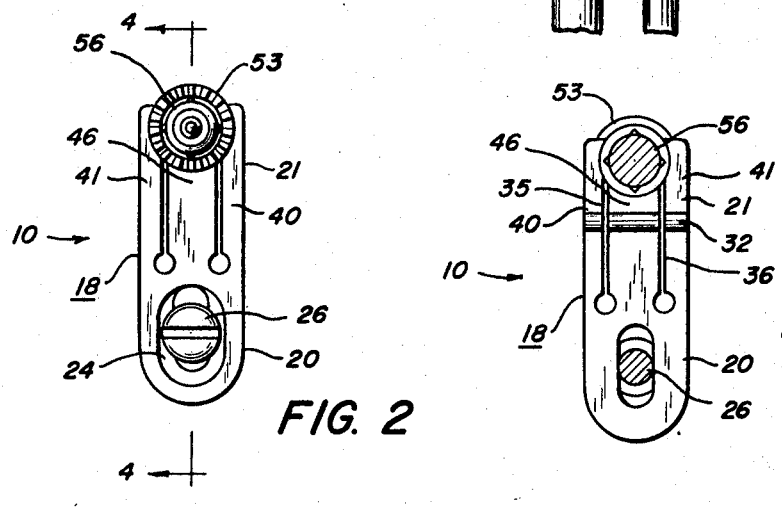
FIGURE 2 is an enlarged view taken generally along the line 2—2 of FIGURE 1.
Figure 3:
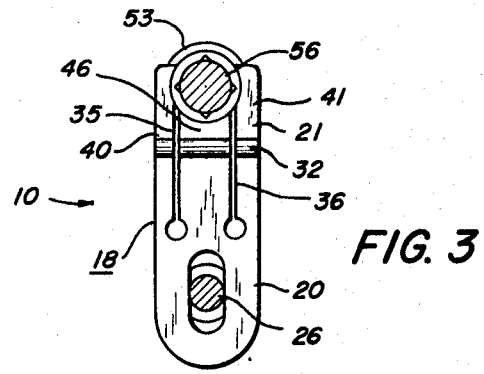
FIGURE 3 is an enlarged view taken generally along the line 3—3 of FIGURE 1.
Figure 4:
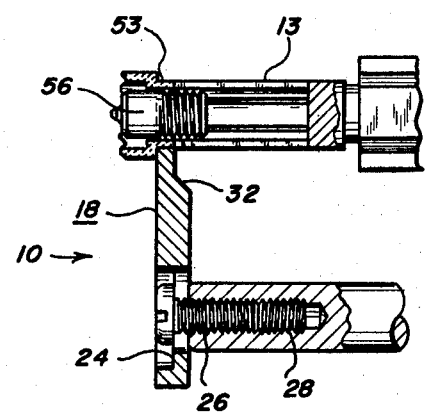
FIGURE 4 is a view taken generally along the line 4—4 of FIGURE 2.
Figure 5:
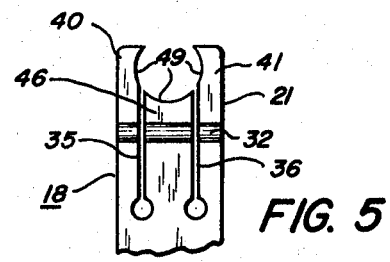
FIGURE 5 is a fragmentary view of a portion of the ferrule chuck as shown in FIGURE 3 with the stud and ferrule removed therefrom.

As best seen in FIGURES 2 and 4 there are provided wall means 24 at the first end portion 20 and these wall means serve to define a slotted opening extending through the member 18 and also provides a counterbore into what may be referred to as the bottom side of the member 18. The counterbore as particularly seen in these two figures is adapted to receive the head of a screw member 26 with the shank of the screw member extending through the slotted opening and into the threaded opening 28 in the end of the support leg 15. By this means the ferrule chuck may be secured in a desired position and slight adjustment for positioning the other end of the ferrule chuck is had by loosening the screw member and shifting the ferrule chuck, within the limits provided by the slotted opening. As best seen in FIGURES 3 and 5, wall means 32 serve to define a shoulder which, in a sense, serves to separate the first and second end portions of the unitary member 18. As noted, in the figures, the first end portion 20 has a larger thickness dimension that the second end portion 21.

Additional wall means 35 and 36 are provided in the second end portion of the unitary member 18 which wall means serve to define first and second slots which extend generally parallel to each other and extend from the first end portion 20 into the second end portion 21. These two slots serve to define first and second fingers 40 and 41 with a tongue member 46 therebetween. Wall means sometimes referred to more specifically as gripping wall means 49 (FIGURE 5) are provided on the end portions of the first and second fingers 40 and 41 and the tongue member 46. In this particular instance the gripping wall means 49 define the circumference or perimeter of slightly more than one-half of a cycle. The reason for this particular configuration on the fingers and the tongue member is because the shape of that portion of the ferrule 53 which is to be gripped is circular in nature. As will be seen, particularly in FIGURES 3 and 4, the neck of the ferrule 53 fits the wall means 49 so as to hold the ferrule in position during a welding operation. As seen in these figures, a stud 56 which has a threaded shank is held by the stud chuck 13.

In operation the ferrule 53, which is of a ceramic construction, and more specifically the neck of the ferrule, is inserted into the ferrule chuck such as shown in FIGURES 1 through 4 in a direction which is generally transverse to the direction or extent of the ferrule chuck itself. The dimension of the neck of the ferrule is such that a slight wedging action is exerted against the fingers 40 and 41 tending to spread them in what may be referred to as an outward direction or in a direction away from each other and the inherent resiliency of the metal from which the fingers are constructed tends to return the fingers or exert a force inwardly to hold the ferrule in position. After a welding operation has been accomplished, the operator of the welding gun 12 merely pulls the same away from the welded stud.

As a result of the construction and operation which has been described hereinabove, it has been found that a much shorter weld stud may be handled by the present ferrule chuck. In prior art devices it was possible to handle weld studs which were for example ⅝ of an inch in length after the welding operation and having for example a ⅜ of an inch outside diameter and with the use of the ferrule chuck of the present invention it has been possible to reduce the length of the studs after welding by from 125 to 135 thousandths of an inch. It is also possible by means of the slotted opening and counterbore in combination with the screw member 26 to provide a construction whereby the end of the ferrule chuck may be adjusted within limits and has also provided a construction whereby the flat bottom side of the ferrule chuck is not interrupted by this adjustment means. The use of the first and second slots to define the spring fingers also accomplishes a construction which is convenient of manufacture and reliable in operation. It also provides a device which is simple in design and much less susceptible of disrepair in the field. The use of this particular design enables a ferrule chuck to be constructed with an extremely small thickness dimension which in turn enables the stud welding apparatus to handle much shorter weld studs.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A ferrule chuck for use with a stud welding gun having a stud chuck and a support leg spaced from and extending generally parallel to each other, said ferrule chuck comprising a generally flat unitary metal member with a relatively small thickness dimension and having first and second end portions, wall means at said first end portion defining a slotted opening therethrough and a counterbore, said counterbore adapted to receive the head of a screw with the shank thereof extending through said slotted opening and into a threaded opening in the end of the support leg to fixedly hold said member in position, wall means between said first and second end portions defining a shoulder with said first end portion having a larger thickness dimension than said second end portion, wall means defining first and second spaced slots extending from said first end portion into said second end portion to define first and second spaced fingers and a tongue member therebetween, gripping wall means at the end portions of said first and second fingers and said tongue member defining the circumference of slightly more than one half of a circle, said gripping wall means adapted to receive the circular shaped neck of a ferrule to hold same in a welding position with the stud chuck holding a stud in a position whereat it extends centrally through the ferrule.

2. A ferrule chuck for use with a stud welding gun having a stud chuck and a support leg, said ferrule chuck comprising a generally flat unitary metal member with a relatively small thickness dimension and having first and second end portions, means at said first end portion to fixedly hold said member to the support leg, wall means defining first and second spaced slots in said second end portion of said member to define first and second fingers and a tongue member therebetween, gripping wall means at the end portions of said first and second fingers and said tongue member defining the circumference of slightly more than one half of a circle, said gripping wall means adapted to receive a portion of a ferrule to hold same in a welding position with the stud chuck holding a stud in a position whereat it extends through the ferrule.

3. A ferrule chuck for use with a stud welding apparatus having a stud chuck and a support leg, said ferrule chuck comprising a generally flat member with a relatively small thickness dimension and having first and second end portions, means at said first end portion for connecting said ferrule chuck to the support leg, wall means defining first and second spaced slots extending lengthwise in said second end portion to define first and second spaced fingers and a tongue member therebetween, gripping wall means at the end portions of said first and second fingers and said tongue member defining the shape of the perimeter of a portion of a ferrule to be held, said gripping wall means adapted to receive the portion of the ferrule to hold same in a welding position with the stud chuck holding a stud in a position whereat it extends through the ferrule.

4. A ferrule chuck for use in holding ferrules in a stud welding operation comprising a generally flat unitary metal member having an end portion, first wall means at said end portion being contoured to surround at least half of the perimeter of a portion of a ferrule, second wall means defining first and second generally parallel slots in said metal member terminating at said first wall means to define first and second spaced fingers with a tongue member therebetween, said first and second fingers being capable of slight outward movement in opposite directions away from said tongue member to receive the portion of the ferrule and by means of the inherent resiliency of the metal tending to return inwardly to aid in holding the portion of the ferrule.

5. A ferrule chuck for use in holding ferrules in a welding operation comprising a generally thin member having an end portion, first wall means at said end portion being contoured to surround a portion of the perimeter of a ferrule, second wall means defining first and second slots in said member terminating at said first wall means to define first and second spaced fingers with a tongue member therebetween, said first and second fingers being capable of slight outward movement in opposite directions away from said tongue member to receive the ferrule and by means of the inherent resiliency of the member tending to return inwardly to aid in holding the ferrule.

References Cited

UNITED STATES PATENTS 2,416,915  3/1947  Evans _____ 219—98
2,727,971  12/1955 Mowry _____ 219—136

RICHARD M. WOOD, *Primary Examiner.*

C. CHADD, *Assistant Examiner.*